(12) United States Patent
Tzara (10) Patent No.: US 8,694,909 B2
(45) Date of Patent: Apr. 8, 2014

(54) DEVICE FOR ANALYSING VARIABLE MAGNITUDES BY SIMULTANEOUS MULTIPLE WINDOWING

(71) Applicant: Wally Tzara, Le Plessis Robinson (FR)

(72) Inventor: Wally Tzara, Le Plessis Robinson (FR)

( * ) Notice: Subject to any disclaimer, the term of this patent is extended or adjusted under 35 U.S.C. 154(b) by 0 days.

(21) Appl. No.: 13/973,511

(22) Filed: Aug. 22, 2013

(65) Prior Publication Data

US 2013/0339900 A1 Dec. 19, 2013

Related U.S. Application Data

(63) Continuation of application No. 12/448,332, filed as application No. PCT/FR2007/002133 on Dec. 20, 2007, now Pat. No. 8,572,503.

(30) Foreign Application Priority Data

Dec. 29, 2006 (FR) ...................................... 06 11525

(51) Int. Cl.
*G06F 3/048* (2013.01)

(52) U.S. Cl.
USPC .......................................................... 715/781

(58) Field of Classification Search
USPC .......................................................... 715/781
See application file for complete search history.

(56) References Cited

U.S. PATENT DOCUMENTS

| | | | |
|---|---|---|---|
| 4,845,653 A | 7/1989 | Conrad et al. | |
| 6,473,084 B1 | 10/2002 | Phillips et al. | |
| 6,700,575 B1 | 3/2004 | Bovarnick et al. | |
| 6,799,127 B1 | 9/2004 | Sontag et al. | |
| 7,062,410 B2 | 6/2006 | Winstead et al. | |
| 7,292,245 B2 * | 11/2007 | Goggin | 345/440 |
| 7,420,563 B2 | 9/2008 | Wakabayashi | |
| 7,483,477 B2 | 1/2009 | Nygaard, Jr. | |
| 7,562,310 B2 | 7/2009 | Champion et al. | |
| 7,747,330 B2 | 6/2010 | Nolan et al. | |

(Continued)

FOREIGN PATENT DOCUMENTS

EP    0 740 246 A2    10/1996

OTHER PUBLICATIONS

International Search Report, dated Jul. 17, 2008, corresponding to PCT/FR2007/002133.

*Primary Examiner* — Enrique Iturralde
(74) *Attorney, Agent, or Firm* — Christie, Parker & Hale, LLP (57) ABSTRACT

The device (D) is dedicated to the analysis of time varying quantities. It comprises a tool for managing display windows (MA) each for displaying the representation of a selected quantity and each associated with a first quantity selection tool (01) and a second time reference(s) selection tool (02) coupled to the management tool (MA). The device (D) further includes a third linking tool (03a-03c) which i) allows a user, who has selected several quantities and related time references, to select at least two of the display windows and the selected quantities, and ii) connects together the first tools (01) and/or second tools (02) of the selected display windows so that the selection of a quantity by the user using one of the first related tools (01), or master tool, of a master window results in the selection of the same quantity by the management tool (MA) at each so-called slave display window, and/or so that the selection of a time reference by one of the second related tools (02) results in the selection of the same time reference by the management tool (MA) at each slave display window.

10 Claims, 6 Drawing Sheets

(56) References Cited

U.S. PATENT DOCUMENTS

| | | | |
|---|---|---|---|
| 7,750,908 B2 * | 7/2010 | Kincaid et al. | 345/440 |
| 8,284,200 B2 * | 10/2012 | Kincaid | 345/440 |
| 2002/0091548 A1 | 7/2002 | Auer et al. | |
| 2004/0027376 A1 | 2/2004 | Calder et al. | |
| 2004/0090472 A1 | 5/2004 | Risch et al. | |
| 2004/0176952 A1 | 9/2004 | Fado et al. | |
| 2005/0130329 A1 | 6/2005 | Liao et al. | |
| 2005/0162423 A1 * | 7/2005 | Goggin | 345/440 |
| 2005/0179684 A1 | 8/2005 | Wallace | |
| 2005/0198042 A1 | 9/2005 | Davis | |
| 2006/0031187 A1 | 2/2006 | Pyrce et al. | |
| 2006/0123355 A1 | 6/2006 | Christiansen et al. | |
| 2007/0028142 A1 | 2/2007 | Elsner et al. | |
| 2007/0046672 A1 | 3/2007 | Shinohara et al. | |
| 2007/0088534 A1 | 4/2007 | MacArthur et al. | |
| 2008/0300916 A1 | 12/2008 | Parkinson et al. | |
| 2009/0088133 A1 | 4/2009 | Orlassino | |
| 2010/0306782 A1 | 12/2010 | Engrand et al. | |
| 2011/0063299 A1 * | 3/2011 | Chuang et al. | 345/440 |
| 2012/0313949 A1 * | 12/2012 | Rope et al. | 345/440 |

* cited by examiner

DEVICE FOR ANALYSING VARIABLE MAGNITUDES BY SIMULTANEOUS MULTIPLE WINDOWING

CROSS-REFERENCE TO RELATED APPLICATION(S)

This application is a continuation of U.S. patent application Ser. No. 12/448,332, filed Jun. 16, 2009, which is a National Phase Patent Application and claims the priority of International Application Number PCT/FR2007/002133, filed on Dec. 20, 2007, which claims priority of French Patent Application Number 0611525, filed on Dec. 29, 2006.

The invention relates to analysis devices for analysing data files representing magnitudes that vary over time, intended to be installed in information processing equipment having at least one data processing microprocessor such as a computer, for example, possibly a portable computer.

The invention relates to any type of magnitude the value of which is likely to evolve over time, such as, for example, the position of an object, the temperature or pressure (possibly atmospheric pressure) in a given location, the progress of an action, or the price of a product.

Moreover, by "analysis device" is meant here a device that can be used to display one or more identical or different representations of identical or different magnitudes, over selected time ranges, in graphic form on at least one screen of a computer installation, in different display windows (optionally grouped within a common "main window").

By "representation" is meant here the representation of the development of a magnitude over time, associated with derived graphic elements. For example, it is possible to represent the value of a parameter (such as the temperature in a location) reported every hour and a moving mean of this value, or the progress of an action reported every minute and a moving mean of this progress.

An analysis device of the type mentioned above generally takes the form of software (or computer) modules, but may also take the form of electronic circuits, or a combination of circuits and software. It may be installed in computer equipment, for example by remote downloading using a server or by loading from a storage medium such as an optically readable disc (CD-ROM or DVD-ROM), a magneto-optical disc or a USB key.

This type of analysis device generally comprises a management tool making it possible to define display windows each intended to display a representation of a selected magnitude, and each associated with a first tool for selecting a first magnitude from among several and a second tool making it possible to select at least one time reference (such as for example the finishing moment and/or starting moment of a display window), and optionally another ("fourth") tool making it possible to select one representation from among several of the magnitude selected.

Each of these first, second and fourth tools takes the form for example of a menu or an input box or a moving button, or a scroll bar or button(s).

As is known to anyone skilled in the art, one of the objectives of an analysis device of the type described hereinbefore is to enable a user to collate possibly different representations of possibly different magnitudes and to carry out so-called "fundamental" control operations using these first and second tools, in order to display a so-called "coherent" set of windows, also known as a "coherent configuration".

By "coherent configuration" is meant here a configuration that makes it possible to achieve at least one of the two objectives mentioned below, for example with the aim of determining possible correlations and/or possible phenomena or behaviours:

comparing at least two identical representations of different magnitudes with one another up to the same final moment and/or starting from the same initial moment, collating at least two different representations of the same magnitude up to the same final moment and/or starting from the same initial moment.

Obtaining exactly the same final moment and/or exactly the same starting moment on different display windows using the first and second tools associated with the latter is a tricky and time-consuming operation which requires considerable attention, on account of the need to repeat the operations for controlling these tools many times, and the imprecise nature of the control of the second tool, particularly when it takes the form of a scroll bar and/or button(s).

To allow greater understanding of the operations that have to be carried out by a user in order to achieve one of the above-mentioned objectives with an analysis device according to the prior art, an embodiment will now be described with reference to FIGS. 1 (display window) and 2 (successive configurations and operations).

In this embodiment, the user (U) has initially selected representations of four different magnitudes and wishes to obtain a coherent configuration related to a final moment t. The initial states of the four display windows Fi (in which the representations of these four different magnitudes are displayed) are designated Eij (E11 (C11, t1, Y11), E21 (C21, t2, Y21), E31 (C31, t3, Y31), and E41 (C41, t4, Y41), where Cij denotes a representation of a selected magnitude in the display window Fi, tk denotes the time reference (for example the final moment) of the display window Fi, and Yij denotes the value of the magnitude Cij at the final moment tk). Moreover, a set of four states Eij constitutes a configuration An. The objective here is therefore to pass from the configuration A1 (E11, E21, E31, E41) to the coherent configuration A4 (E12, E22, E31, E42).

In order to do this, the user has, for example, to carry out the following monitoring operations using the first and second tools associated with the four display windows Fi:

selection S2 and S4 of two new magnitudes C22 and C42 in the windows F2 and F4, using the first tools associated therewith. This gives a second configuration A2 (E11 (C11, t1, Y11), E'21 (C22, t2, Y22), E31 (C31, t3, Y31) and E'41 (C42, t4, Y42));

selection D1 of the time reference t in the window F1 placed in the state E11 and associated with the magnitude C11. This gives a third configuration A3 (E12 (C11, t, Y12), E'21 (C22, t2, Y22), E31 (C31, t3, Y31), and E'41 (C42, t4, Y42));

successive selections D2 and D4 of the time references in the windows F2 and F4, placed respectively in the states E'21 and E'41 and respectively associated with the magnitudes C22 and C42, until the time reference t for the window F1 is obtained. This gives the fourth coherent configuration A4 (E12 (C11, t, Y12), E22 (C22, t, Y23), E31 (C31, t3, Y31), and E42 (C42, t, Y43)), this coherent configuration being designated (O) in the Figures.

The higher the number of display windows, the more the user has to carry out monitoring operations using the first and second tools associated with these display windows so as to obtain an eventual coherent configuration.

The aim of the invention is therefore to improve the situation.

To this end, it proposes a device for analysing data files (representative of values assumed by magnitudes that vary over time), of the type described in the introduction and comprising a third link tool to supplement the display windows management tool, first magnitude selection tools and second time reference selection tools [and optionally also fourth magnitude representation selection tools], associated with the different display windows. This third link tool enables a user who has selected a number of magnitude representations and the associated time references to select at least two of the display windows of the selected magnitudes. This third link tool is also tasked with linking together the first tools and/or the second tools of the selected display windows so that each time the user selects a magnitude using one of the first linked tools, known as the master and associated with a master display window, this results in the selection of the same magnitude by the management tool at each so-called slave display window, and/or each time the user selects a time reference using one of the second linked tools, known as the master and associated with a master display window, this results in the selection of the same time reference by the management tool at each slave display window.

The analysis device according to the invention may have other features which may be taken separately or in combination, and notably:

its third link tool may be tasked, when a magnitude has been selected by the user by means of a master linked first tool, with causing an identical magnitude to be selected by the management tool at each slave display window, as well as causing the selection by the management tool of the time reference of one of the display windows selected at each slave display window;

alternatively, its third link tool may be tasked, when a magnitude has been selected by the user by means of a master linked first tool, with triggering an identical magnitude selection by the management tool at each slave display window, as well as the use by the management tool of the last known moment of each magnitude selected as time reference at each of said selected display windows;

its third link tool may be tasked with triggering the use of the time reference of the master display window by each slave display window;

alternatively, its third link tool may be tasked with triggering the use of the most recent time reference among those of the display windows selected by means of the linked second tools;

each time reference may be selected for example from among the starting moment of the display window and the finishing moment of the display window;

its third link tool may be tasked, when first tools of selected display windows have been linked, with triggering the stoppage of the displaying of the linked slave first tools, the latter then being represented by the linked master first tool;

its third link tool may be tasked, when second tools of selected display windows have been linked, with triggering the stoppage of the displaying of the linked slave second tools, the latter then being represented by the linked master first tool;

alternatively, its third link tool may be tasked, when first tools and/or second tools of selected display windows have been linked, with triggering the change in the appearance of each display window selected and/or the change in the appearance of each linked first tool and/or each linked second tool;

as another alternative, its third link tool may be tasked, when first tools and/or second tools of selected display windows have been linked, with triggering the change in the appearance of the slave display windows and/or the change in the appearance and temporary inactivation of each linked slave first tool and/or each linked slave second tool;

its third link tool may be tasked, in the event of deselection of the master and slave display windows, with breaking the corresponding links between the first tools and/or between the second tools;

its third link tool may be tasked, after the breaking of the corresponding links between linked first tools and/or between linked second tools, with triggering the restoration of the time reference which was selected before the establishment of the link of each magnitude at each of the second tools previously linked;

alternatively, its third link tool may be tasked, after the breaking of the corresponding links between linked first tools and/or between linked second tools, with triggering the selection of the last known time reference for each magnitude at each of the second tools previously linked.

The invention also proposes a storage medium intended to be connected to computer equipment and storing an analysis device of the type described hereinbefore and arranged in the form of program(s).

Further features and advantages of the invention will become apparent from a study of the detailed description that follows, and the attached drawings, wherein.

The attached drawings may serve not only to complement the invention but also to help define it, as necessary.

The invention sets out to make it easier for a user to obtain a coherent configuration of display windows by means of a device for analysing data files representative of magnitudes that may vary over time.

In the following description the magnitudes to be displayed will be deemed to be courses of action, by way of a non-restrictive example. However, the invention relates to any type of magnitude the value of which is liable to change over time, and in particular the position of an object, or the temperature or pressure (possibly atmospheric pressure) in a given place, or the price of a product.

Figure 3:
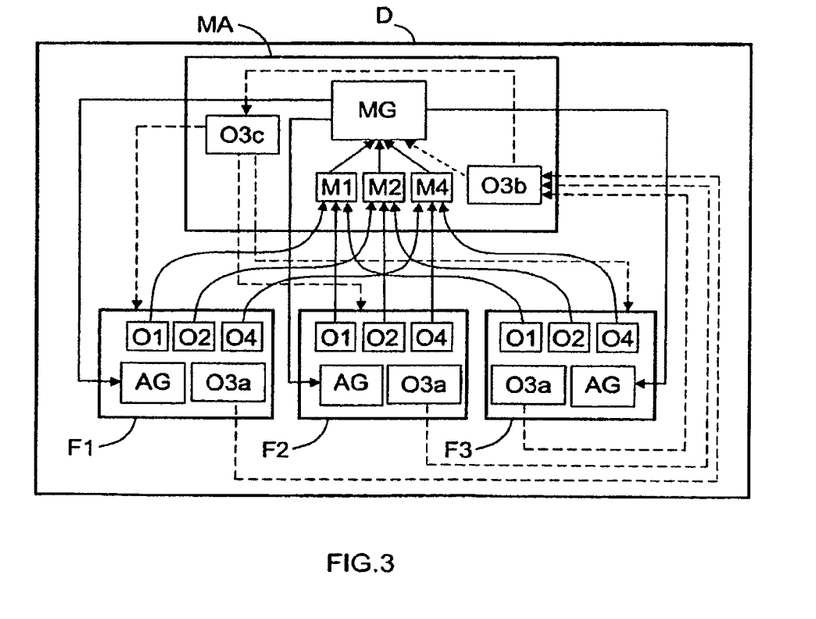
FIG. 3 shows in a highly schematic and functional form an embodiment of an analysis device according to the invention.

Reference will be made first of all to FIG. 3 to show an embodiment of an analysis device D according to the invention by way of example.

As indicated in the introductory part, the analysis device D is intended to allow one or more identical or different representations of identical or different magnitudes Cij to be displayed in graphic form, over identical or different selected time ranges, on at least one screen (EC) of a computer installation, in different display windows (Fi) (at least two (i≥2), optionally grouped within a common "main window").

In the embodiment illustrated only three windows F1 to F3 are shown, but the device D is intended to manage at least two of them.

This type of device D is intended to be installed in a computer installation having at least one data processing microprocessor, at least one display screen (EC), storage media and a man/machine interface (keyboard, mouse and the like). This computer installation may be for example a (micro)computer which is optionally portable (or mobile).

This analysis device D is preferably made in the form of software (or computer) modules. However, it may also take the form of electronic circuits or a combination of circuits and software, such as for example a specialised video card with several outputs.

When it is in the form of software modules, it may for example be installed in the computer equipment by remote downloading via a server, or by loading from a storage medium such as an optically readable disc (CD-ROM or DVD-ROM), a magneto-optical disc or a USB key, on which it is stored.

The analysis device D comprises first of all a tool MA for managing display windows Fi. This management tool MA is tasked with defining display windows Fi each of which is intended to display the representation of a magnitude Cij selected by the user of the computer equipment in which it is installed, by means of the man/machine interface. It is important to note that the representation of a magnitude Cij may optionally also be selected from among several by the user by means of the man/machine interface of the computer equipment.

The representation may be, for example, in the case of a magnitude such as the progress of an action, the progress reported every 30 minutes accompanied by a set of two movable means of different lengths or a weighted mean.

The management tool MA is also tasked with assigning to each display window Fi a first tool O1 enabling the user to select one magnitude Cij from among many, and a second tool O2 enabling the user to select at least one time reference tk (such as for example the end (or final) moment or the starting (or initial) moment of a display window Fi), and optionally (as shown) a fourth tool O4 enabling the user to select the representation of one magnitude Cij from among many.

Figure 4:
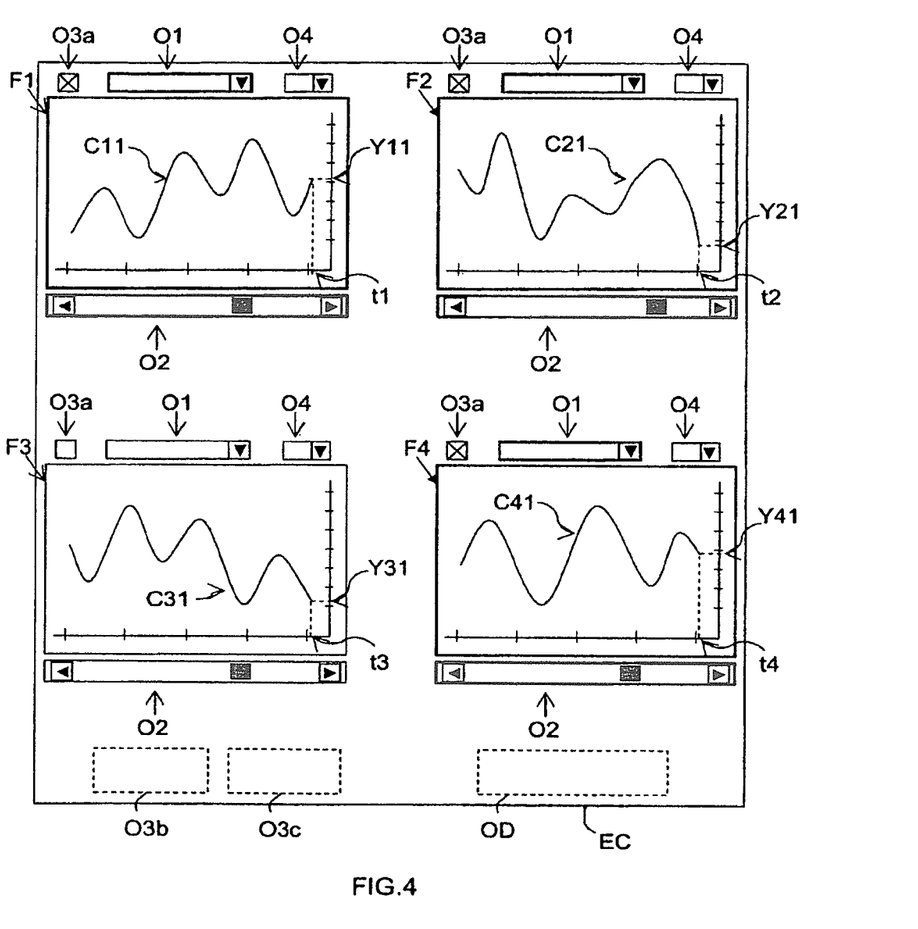
FIG. 4 shows in highly schematic form a first example of the displaying on a screen (EC) of four display windows by means of an analysis device according to the invention, three of these display windows (F1, F2 and F4) being linked.

As schematically shown in FIG. 4, each of the first tools O1, second tools O2 and fourth tools O4 take the form, when displayed on a screen (EC), of a menu or an inputting field or a moving button, and/or a scroll bar or scroll button, for example.

More precisely, in the non-restrictive example shown in FIG. 4, each first tool O1 associated with a display window Fi is in the form of a rolling inputting field, each second tool O2 associated with a display window Fi is in the form of a rolling inputting field and each fourth tool O4 associated with a display window Fi is in the form of a scroll bar.

Figure 1:
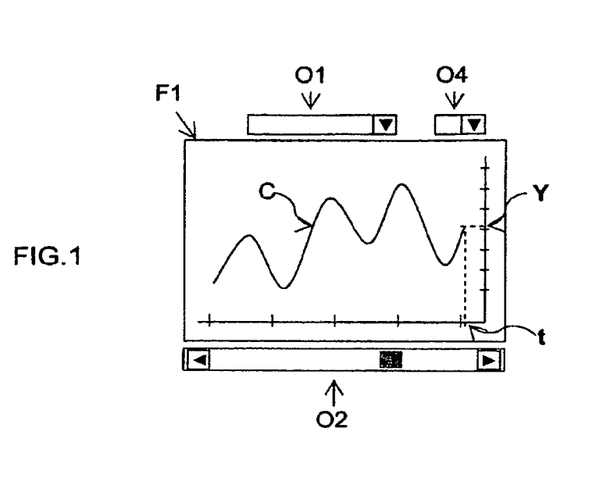
FIG. 1 shows in highly schematic form an example of a display window and the first, second and fourth associated tools, generated by an analysis device according to the prior art.
Figure 2:
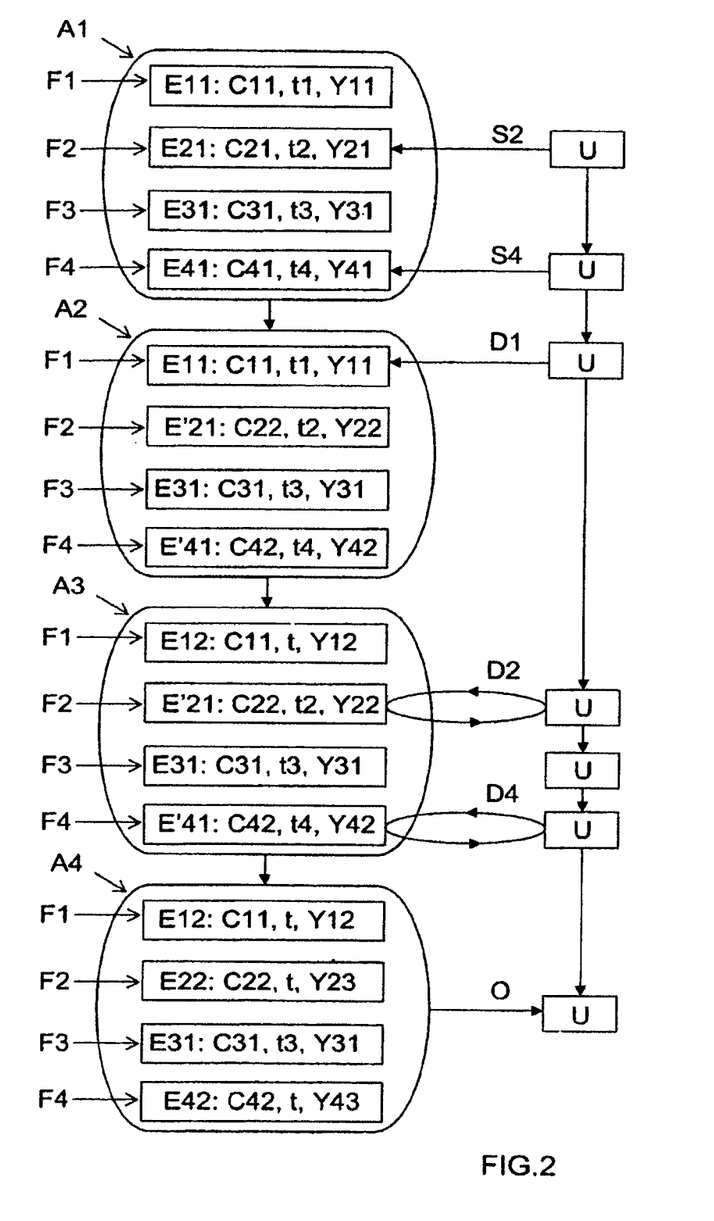
FIG. 2 shows in highly schematic form an example of successive configurations and series of operations required in order to obtain a coherent configuration in the case of an analysis device according to the prior art.

As shown in FIG. 1, the management tool MA comprises for example a management module MG and management sub-modules M1, M2 and M4. The management sub-modules M1, M2 and M4 receive display instructions from the first, second and fourth tools O1, O2 and O4, respectively, which are associated with the different display windows Fi used. These instructions are representative of the selections made by this user for each display window Fi that he uses and that is displayed on one or more screens EC.

The management sub-modules M1, M2 and M4 generate requests intended for the management modules MG from the instructions received. The management module MG generates magnitude graphs intended to be displayed in the display windows Fi used by the user, from the requests emanating from the management sub-modules M1, M2 and M4.

Each display window Fi is defined by a (graphic) display tool AG which receives the graph generated for its display window Fi by the management module MG.

According to the invention, the analysis device D also comprises a third tool O3 known as the link tool. This latter enables the user who has already selected a number of magnitudes Cij and the associated time references tk and, optionally, the associated representations, to select at least two of the display windows Fi of these selected magnitudes Cij, in order to link the first tools O1 associated therewith to one another and/or to link the second tools O2 associated therewith to one another.

It will be noted that the reference O3 does not appear in the Figures. It is only a reference used in the text to denote various elements (or parts) that cooperate together within the links and are hereinafter designated O3a, O3b and O3c.

These links between tools O1 and/or O2 are intended to force them to select the same magnitude (O1) or the same time reference tk simultaneously. More precisely, when the user selects a magnitude Cij by means of one of the first tools O1 linked by means of the third tool O3, i.e. said master first tool associated with a master display window, the third tool O3 sends instructions to the management tool MA and more precisely to its management module MG, so that it simultaneously uses the same magnitude Cij at each so-called slave display window.

The third tool O3 may also, and optionally within the same period of time, send instructions to the management tool MA and more precisely to its management module MG, so that it simultaneously uses the time reference tk of one of the selected display windows Fi in each of said selected display windows.

It is important to note that there are circumstances in which the time references cannot be the same in different windows. For example the Nasdaq 100 and Cac 40 indices can only be displayed synchronously in French time between 1530 h and 1730 h. More generally, displayed time references are only synchronous when the associated magnitudes are defined at the same moment. Therefore, time synchronisation (common time reference tk) can only be done when it is possible. When synchronisation is not possible, one (or more) representation(s) remain on hold until synchronisation is possible again.

Moreover, when the user selects a time reference (final moment or initial moment) tk by means of one of the second tools O2 linked by means of the third tool O3, i.e. said master second tool associated with a master display window, the third tool O3 sends instructions to the management tool MA, and more precisely to its management module MG, so that it simultaneously uses this same time reference tk at each of the selected display windows Fi and hence at each of said slave windows.

It will be noted that the time reference tk which is used in common in each of the linked windows may for example be the one used in the linked display window which is the master when the user has selected it. When windows/tools have been linked, but before any control operation, the device D may force each window to use the last known time reference (for example the present moment) relative to the magnitude already present in this window.

It should also be noted that the master window may be required to be the one that has the lowest value for the index i of the linked windows. However, this is not obligatory. It is possible in fact to envisage an embodiment in which the master window is the one that is the object of the first selection operation after being linked, or the one chosen for this purpose by the user (in this case, additional selection means must be provided to enable the user to choose the master window).

As schematically shown in FIG. 3, the third tool O3 comprises, for example, on the one hand, first parts O3a which are associated respectively with the display windows Fi to enable the user to select at least some of them with a view to linking them to one another and, on the other hand, a second part O3b tasked with making the link between the first tools O1 and/or between the second tools O2 of the display windows Fi selected by means of the first parts O3a. As shown, the second part O3b of the third tool O3 may for example be part of the management tool MA.

As shown schematically in FIG. 4, each of the first parts O3a of the third tool O3 may for example take the form of a tick box as displayed on an EC screen. In this case, when the user clicks on a tick box O3a, using the mouse of the man/machine interface, the associated display window Fi is immediately selected. This is made evident for example by the appearance of a cross in the tick box O3a. However, any other means of selecting a display window Fi may be envisaged, particularly a control button (on which the user may click for example to activate or deactivate a link). It is also possible to envisage that clicking within a display window Fi causes it to be selected (for example windows can be selected by holding down the "Ctrl" key on the keyboard while clicking successively on each of the windows that are to be selected (and hence linked)).

The second part O3b receives linking instructions coming respectively from the first parts O3a associated with the windows Fi used at a given moment by the user. These instructions are representative of the linking selections carried out by this user for each display window Fi that he uses and which is displayed on one or more screens EC. The second part O3b generates link requests intended for the management module MG from the instructions received. The management module MG then generates the magnitude graphs intended to be displayed in the display windows Fi used by the user, from the requests emanating from the management sub-modules M1, M2 and M4, taking account of the requests emanating from the second part O3b.

It will be noted that the third tool O3 may for example comprise a third part O3c, coupled to its second part O3b and arranged, when first tools O1 and/or second tools O2 of selected display windows Fi have been linked, so as to trigger the change in the appearance of each display window Fi selected and/or the change in the appearance of each linked first tool O1 and/or each linked second tool O2. This is the case in the non-restrictive example shown in FIG. 4. More precisely, in this example, the frame of each display window selected (in this case F1, F2 and F4), of each linked first tool O1 and of each linked second tool O2 is in bold, to differentiate the selected display windows more clearly from those that have not been selected (in this case F3).

The changes in appearance of the slave windows are requested by the third part O3c of the third tool O3 from the display tools AG and from the first tools O1, second tools O2 and fourth tools O4 associated with the different windows used.

In an alternative (not shown), the third link tool O3 (and more precisely its third part O3c) may be arranged, for example, when first tools O1 and/or second tools O2 of selected display windows Fi have been linked, so as to trigger the change in the appearance of each selected display window Fi and/or the change in the appearance of each slave first tool O1 and/or each slave second tool O2, as well as the temporary inactivation of each slave first tool O1 and/or each slave second tool O2.

By "slave tool" is meant here a tool that is forced simultaneously to use a selection identical to that made by the user with the homologous master tool. For example, if the user has linked the windows F1, F2 and F4 by means of the associated first parts O3a of the third tool O3 and is using the first tool O1 of the first window F1 to select a magnitude C1j, then the window F1 is the master window and the first tool O1 associated with this window F1 is the master first tool. Consequently, the other two windows F2 and F4 are slave windows and their first tools O1 are slave first tools forced to follow simultaneously the selection made by the user by means of the master first tool of the master window F1.

Moreover, the term "temporary inactivation" here means the fact of temporarily rendering a first O1 or second O2 slave tool inactive so that the user cannot use it to make a selection (only the linked master first O1 or second O2 tool can then be used to make a selection which is followed in identical manner by each linked slave first tool O1 or second tool O2).

The temporary inactivation of each slave first tool O1 and/or of each slave second tool O2 may be managed for example by the third part O3c of the third tool O3.

Figure 6:
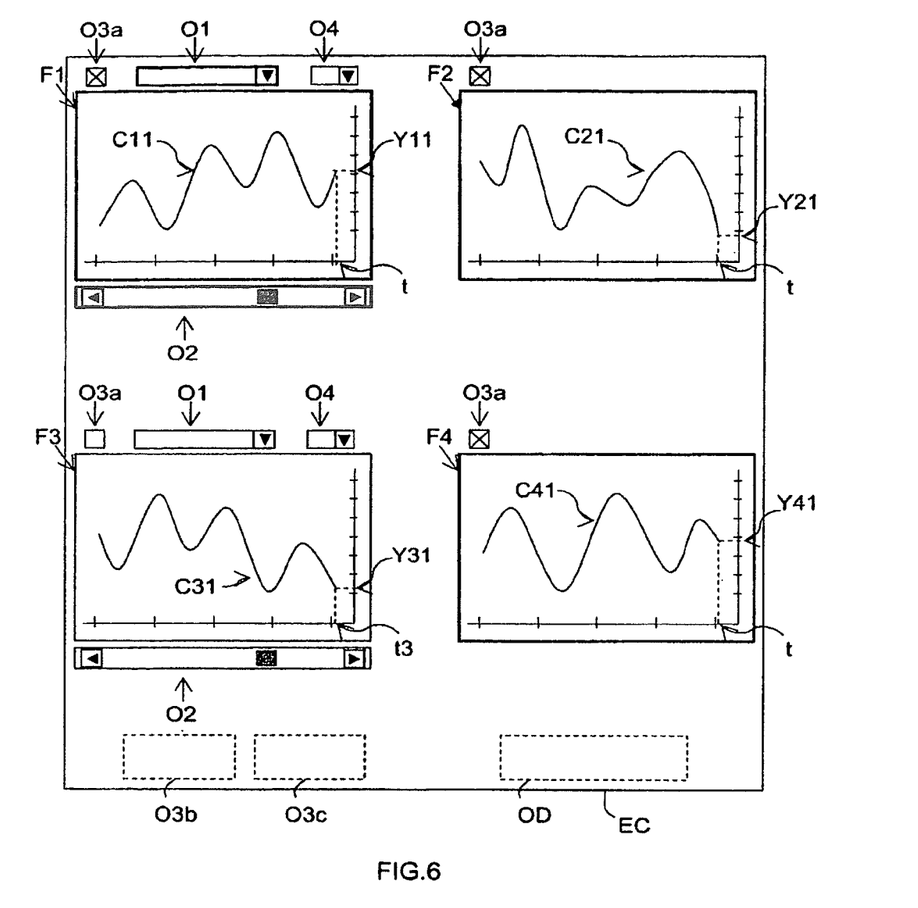
FIG. 6 shows in highly schematic form a second example of the displaying of four display windows on a screen (EC) by means of an analysis device according to the invention, three of these display windows (F1, F2, and F4) being linked.

In another variant illustrated in FIG. 6, the third link tool O3 (and more precisely the third part O3c thereof) may be arranged for example, when first tools O1 and/or second tools O2 of selected display windows Fi have been linked, so as to trigger the stoppage of the displaying of the linked slave first tools O1 and/or linked slave second tools O2. In this case, only the master first tool O1 and/or the master second tool O2 continue(s) to be displayed and available for use by the user. The slave first tools O1 and/or second tools O2 are then respectively represented by the master first tools O1 and/or second tools O2.

In the non-restrictive example shown in FIG. 6, the frame of each selected display window (in this case F1, F2 and F4) is in bold lines to differentiate more clearly from the unselected display windows (in this case F3), and only the master first tools O1 and second tools O2 of the first master window F1 are displayed (the slave first tools O1 and second tools O2 of the slave windows F2 and F4 have been cancelled on the orders of the third part O3c of the third tool O3.

When the user decides to deselect all or some of the linked windows, for example by clicking once more on the first parts O3a of these windows, the third tool O3 (and more specifically its second part O3b) breaks (removes) the corresponding links between first tools O1 and/or second tools O2. In the absence of a tick box, the deselection of the linked windows may be carried out by holding down the "Ctrl" key on the keyboard while clicking successively on each of said windows to be deselected. Once the deselection has been carried out, the third tool O3 (and more precisely its second part O3b) may for example leave the first tools O1 and/or the second tools O2 previously linked in their current state, or it may leave the first tools O1 previously linked in their current state and restore, at each of the previously linked second tools O2, the time reference at the last known moments relative to each magnitude. Moreover, if the displaying of the slave first tools O1 and/or second tools O2 is stopped, the third tool O3 (and more precisely its third part O3c) causes them to be displayed again in association with their respective windows Fi. When windows are no longer linked they are once again independent of one another.

Figure 5:
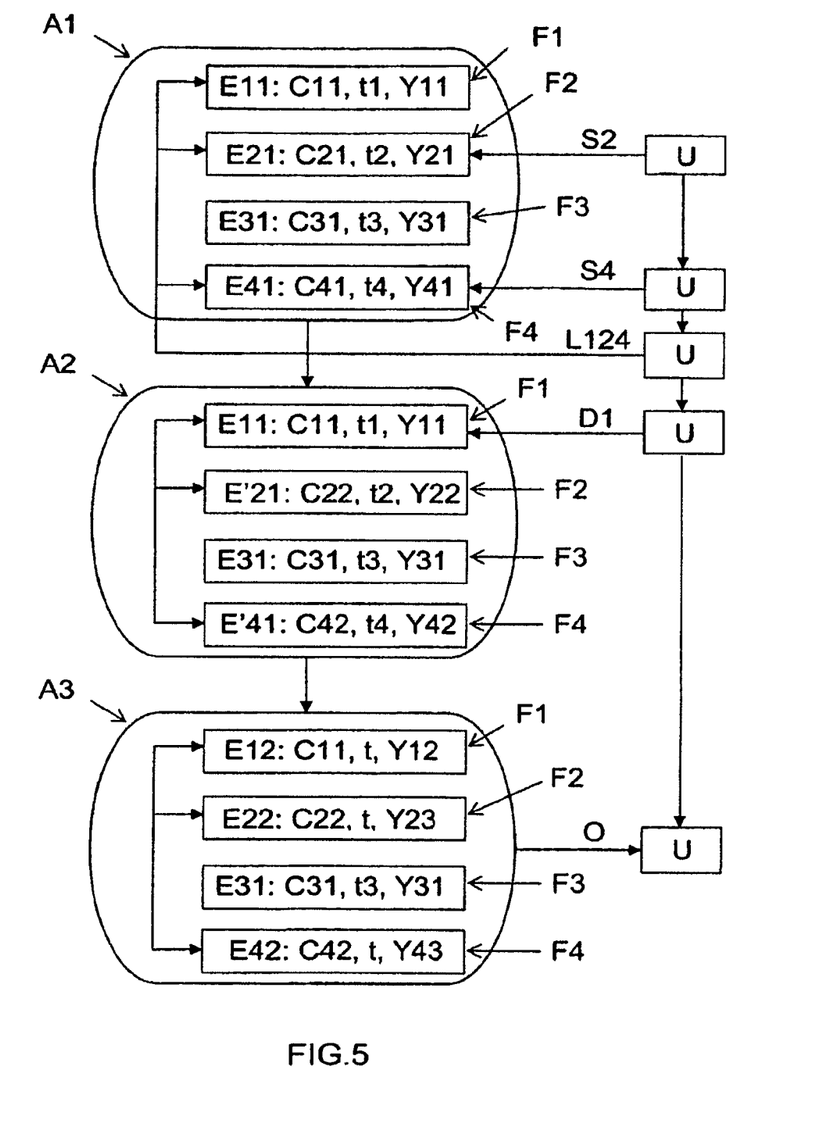
FIG. 5 shows in highly schematic form a first example of successive configurations and series of operations required in order to obtain a coherent configuration in the case of an analysis device according to the invention.

A first example of the use of the analysis device D according to the invention will now be described with reference to FIG. 5.

In this first example, illustrating the first objective mentioned in the introductory part, the user (U) has initially selected representations of four different magnitudes and wishes to obtain a coherent configuration (O) relating to a final moment (time reference) t. The initial states of the four display windows Fi (in which the representations of the four different magnitudes are displayed) are designated Eij (E11 (C11, t1, Y11), E21 (C21, t2, Y21), E31 (C31, t3, Y31), and E41 (C41, t4, Y41), where Cij denotes a representation of a selected magnitude in the display window Fi, tk denotes the time reference (for example the final moment) of the display window Fi, and Yij denotes the value of the magnitude Cij at the final moment tk). The objective here is therefore to pass from the configuration A1 (E11, E21, E31, E41) to a coherent configuration (O).

In order to do this, the user (U) has to carry out the following monitoring operations, for example, using the first tools O1 and second tools O2 associated with the four display windows Fi:

selection S2 and S4 of two new magnitudes C22 and C42 in the windows F2 and F4, using the first tools O1 associated therewith. Then linking (L124) of the windows F1, F2 and F4. This gives a second configuration A2 (E11 (C11, t1, Y11), E'21 (C22, t2, Y22), E31 (C31, t3, Y31) and E'41 (C42, t4, Y42));

selection D1 of a time reference (final moment) t in the window F1 placed in the state E11 and associated with the magnitude C11. The windows F1, F2 and F4 being linked, this selection D1 causes the simultaneous selection of the same time reference (final moment) t at the second tools O2 associated with the windows F2 and F4. This gives a third, coherent, configuration A3 (E12 (C11, t, Y12), E22 (C22, t, Y23), E31 (C31, t3, Y31), and E42 (C42, t, Y43)), designated (O).

As can be seen by comparing the series of operations illustrated in FIGS. 2 (prior art) and 5 (invention), which result in the same coherent configuration (O) starting from the same initial configuration A1, the invention makes it possible to eliminate the successive operations D2 and D4 of selecting the time reference t at the windows F2 and F4.

Figure 7:
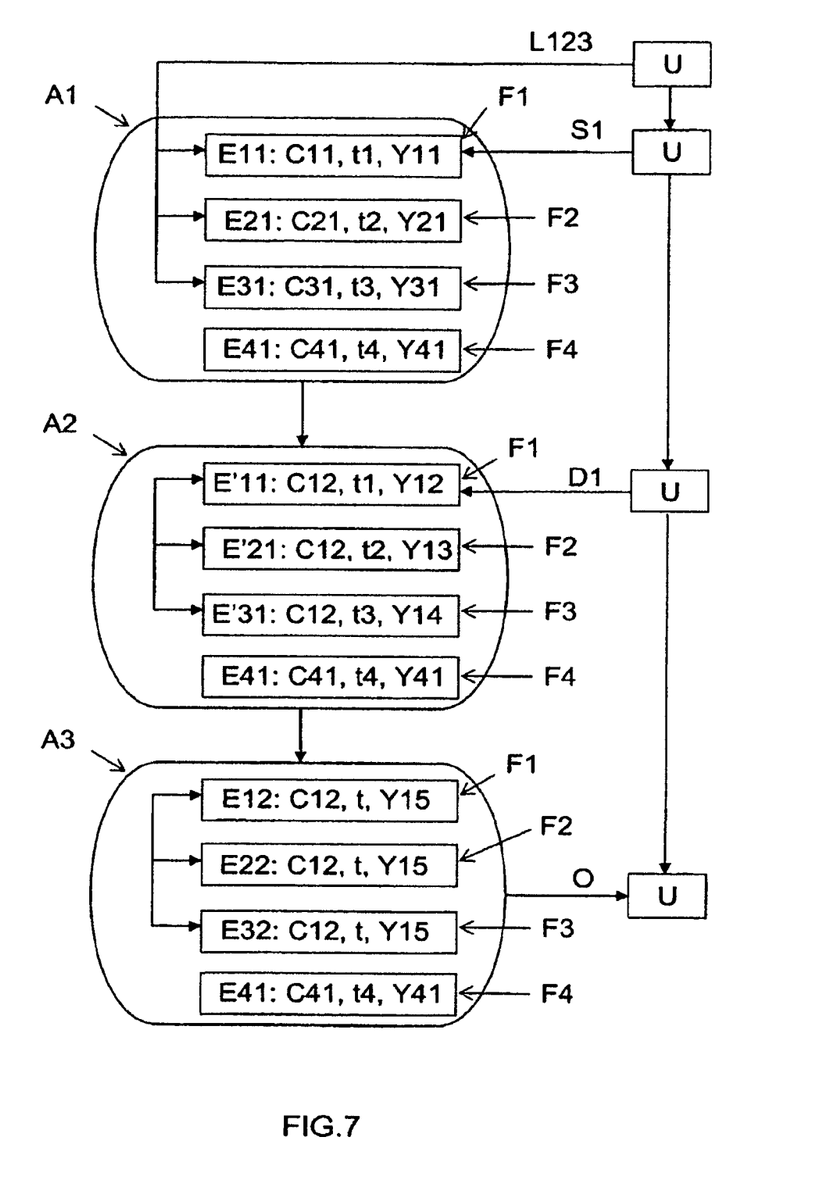
FIG. 7 shows in highly schematic form a second example of successive configurations and series of operations required in order to obtain a coherent configuration in the case of an analysis device according to the invention.

A second example of the use of the analysis device D according to the invention will now be described with reference to FIG. 7.

In this second example illustrating the second objective mentioned in the introductory part, the user has also initially selected representations of four different magnitudes and wishes to obtain a coherent configuration (O) relating to a final moment t. The initial states of the four display windows Fi are identical to those of the first example described hereinbefore. (A1 (E11 (C11, t1, Y11), E21 (C21, t2, Y21), E31 (C31, t3, Y31), and E41 (C41, t4, Y41)).

The user carries out the following control operations, for example, using the first tools O1 and second tools O2 associated with the four display windows Fi:

linking (L123) the windows F1, F2 and F3. Then selecting S1 a new magnitude C12 in the window F1, using the first tool O1 associated therewith. As the windows F1, F2 and F3 are linked, this selection S1 results in the simultaneous selection of the same magnitude C12 at the first tools O1 associated with the windows F2 and F3. This gives a second configuration A2 (E'11 (C12, t1, Y12), E'21 (C12, t2, Y13), E'31 (C12, t3, Y14), and E41 (C41, t4, Y41));

selecting D1 a time reference (final moment) t in the window F1 placed in the state E'11 and associated with the magnitude C12. The windows F1, F2 and F3 being linked, this selection D1 causes the simultaneous selection of the same time reference (final moment) t at the second tools O2 associated with the windows F2 and F3. This gives a third, coherent, configuration A3 (E12 (C12, t, Y15), E22 (C12, t, Y15), E32 (C12, t, Y15), and E41 (C41, t4, Y41)), designated (O). As all three states E12, E22 and E32 correspond to representations which are a priori different from a first magnitude, they also correspond to the same final value Y15 of the magnitude C12 as they have the same common final moment t.

It will be noted that the selection operation D1 may be carried out on any of the windows F1, F2 or F3. Moreover, the selection operations S1 and D1 may be carried out in any order.

The invention is not limited to the embodiments of the analysis device and storage medium described hereinbefore, purely by way of example, but encompasses all the alternatives that may be envisaged by the skilled man within the scope of the claims that follow.

What is claimed is:

1. A non-transitory computer readable medium embodying program instructions for execution by a data processing apparatus, the program instructions adapting the data processing apparatus for analysing data files representative of values assumed by quantities that vary over time, said program instructions comprising: managing a plurality of display windows via a display window management tool, each display window for displaying a representation of a selected quantity and, being associated with a first quantity selecting tool, and a second time reference selecting tool and a fourth representation selection tool, coupled to said management tool, each display window further comprising a third linking tool arranged so as to enable a user who has selected a number of quantities and associated time references and a representation for each selected quantity, to select at least two of the plurality of display windows associated with the selected quantities, and link together the first tools, the second tools and the fourth tools of the selected display windows, so that the selection of a particular quantity by the user using a master linked first tool selected from the linked first tools and associated with a master display window chosen from the selected display windows results in an automatic selection of the particular quantity by said management tool on each slave display window from the selected display windows without changing the representation and the time reference in each selected display windows and without affecting the one or more display windows of the plurality of windows not selected by the user, and the selection of a particular time reference by the user using a master linked second tool selected from the linked second tools and associated with a master display window chosen from the selected display windows results in an automatic selection of the particular time reference by said management tool on each slave display window from the selected display windows without changing the quantity and the representation in each selected display windows and without affecting the one or more display windows of the plurality of windows not selected by the user, and the selection of a particular representation by the user using a master linked fourth tool selected from the linked fourth tools and associated with a master display window chosen from the selected display windows results in an automatic selection of the particular representation by said management tool on each slave display window from the selected display windows without changing the quantity and the time reference in each selected display windows and without affecting the one or more display windows of the plurality of windows not selected by the user.

2. The computer readable-medium according to claim 1, characterised in that said third linking tool is arranged so that the selection of a master window by the user results in automatic selection of the quantity associated to the master window by said management tool on each slave display window.

3. The computer readable-medium according to claim 1, characterised in that said third linking tool is arranged so that the selection of a master window by the user results in automatic selection of the time reference associated to the master window by said management tool on each slave display window.

4. The computer readable-medium according to claim 1, characterised in that said third linking tool is arranged so that the selection of a master window by the user results in automatic selection of the representation associated to the master window by said management tool on each slave display window.

5. The computer readable-medium according to claim 1, characterised in that said third linking tool is arranged so that the selection of a master window by the user results in automatic selection of the quantity, the time reference and the representation associated to the master window by said management tool on each slave display window.

6. The computer readable-medium according to claim 1, characterised in that each time reference of a display window is the ending instant of the quantity in said display window.

7. The computer readable-medium according to claim 1, characterised in that the first tool, the second tool or the fourth tool is shared between plurality of display windows.

8. The computer readable-medium according to claim 1, characterised in that the third tool is arranged, in response to the linking of the first tool, of the second tool or of the fourth tool, or any combination of the three, of the selected display windows, so as to induce a change in appearance of the master window or of the slave windows, or of the master window and the slave windows.

9. The computer readable-medium according to claim 1, characterised in that said third linking tool is arranged, in response to deselection of said master and slave display windows, so as to cease the corresponding linking between the linked first tools, between the linked second tools, between the linked fourth tools, or between the linked first tools, between the linked second tools and between the linked fourth tools.

10. The computer readable-medium according to claim 1, characterised in that said third linking tool is arranged so that the selection of the particular quantity by the user via the master linked first tool results in selection of the particular quantity by said management tool on each slave display window, as well as selection by said management tool of a time reference of one of the selected display windows on each selected display window.

* * * * *